Dec. 17, 1963  G. E. EDWARDS ETAL  3,114,686
PROCESS FOR THE PRODUCTION OF ELECTROLYTIC PRODUCTS BY
THE ELECTROLYSIS OF BRINE AND APPARATUS THEREFOR
Filed June 13, 1960
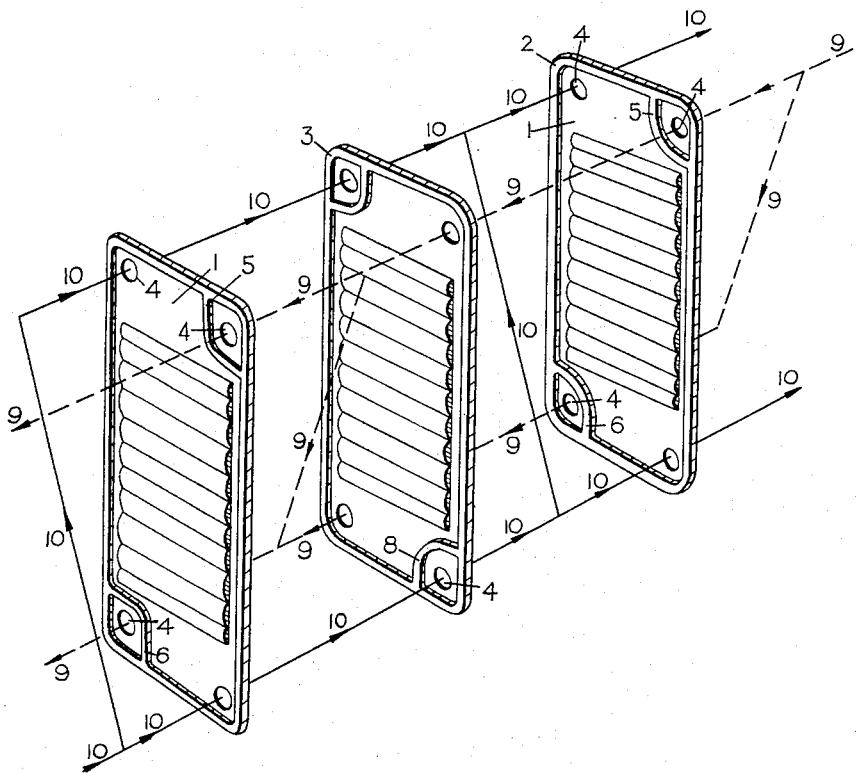
INVENTORS
GEORGE ERNEST EDWARDS
ARTHUR WESLEY RAVENSCROFT
BY Cushman, Darby & Cushman
ATTORNEYS United States Patent Office 3,114,686
Patented Dec. 17, 1963

3,114,686
PROCESS FOR THE PRODUCTION OF ELECTRO-
LYTIC PRODUCTS BY THE ELECTROLYSIS OF
BRINE AND APPARATUS THEREFOR
George Ernest Edwards, Widnes, and Arthur Wesley
Ravenscroft, Runcorn, England, assignors to Imperial
Chemical Industries Limited, London, England, a cor-
poration of Great Britain
Filed June 13, 1960, Ser. No. 35,687
Claims priority, application Great Britain June 19, 1959
5 Claims. (Cl. 204—99)

The present invention relates to improvements in or relating to a process for the production of electrolytic products by the electrolysis of brine and to apparatus therefor and is particularly concerned with a process for the production of electrolytic products by the electrolysis of brine in a mercury cell in association with a heat exchanger and to a heat exchanger therefor.

Electrolysis of brine in mecury cells can take place for instance in two ways. Spent brine from a mercury cell can for instance either be allowed to run to waste or it can be resaturated with salt and again subjected to electrolysis in a mercury cell.

In a so-called waste brine process it is usual to purify the raw brine only as regards its magnesium and iron contents. From the thus purified brine about half its salt is removed by electrolysis in a mercury cell and the exit brine from the cells which is at an elevated temperature owing to the degradation of electrical energy to heat in ohmic resistance in the cell. Brine leaves the cell saturated with chlorine and whilst part of the dissolved chlorine may be recovered some is lost as residual dissolved chlorine in the brine discharge to waste.

In a resaturation brine process raw brine is purified for its magnesium, iron and calcium contents and is then evaporated to recover the salt. The brine leaving a mercury cell is resaturated with the salt obtained in this way. Alternatively rock salt or solar salt may be used to resaturate the brine in which case it is usually necessary to purify the resaturated brine for its magnesium, iron and calcium contents before it is returned to the cells. In these resaturation processes a substantial part of the heat generated in the brine is conserved. The cells operate therefore at a higher temperature than in a waste brine process.

In some instances it may be advantageous to cool the exit brine from the cells and then to return it to brine cells for resaturation.

In a waste brine process the voltage of the mercury cell is usually higher than in a resaturation system because it is customary for the brine to be fed cold to the cell. It has been recognized for some time however that it would be advantageous to heat the brine fed to the mercury cells in a waste brine process. If the heating were with steam the cost of heating with steam would hardly be regained in the reduction of voltage as a result of operating at a higher temperature. The temperature of the feed brine could however be raised by utilising the heat at present lost in the hot brine leaving the cell but it has not so far been possible to do this economically because of the corrosive action of the hot chlorine charged waste brine.

For a resaturation system of electrolysing brine in a mercury cell in recent years a very noticeable tendency is developing to operate at higher and higher loads. Thus, whilst until recently a load of 2–3 ka./m.² was general, load of twice and three times this are now being applied so a higher voltage drop occurs across the cell to drive this higher current through it. Correspondingly there is a higher heat dissipation in the cell and therefore a higher brine temperature. This increase in temperature may proceed to such an extent that the temperature limit for certain of the constructional materials in the cell, for example, ebonite-lined mild steel, may be exceeded and a certain amount of heat removal from the recirculating brine may be required before it is returned to the cell notwithstanding that the energy required to produce a given amount of chlorine or alkali is less the higher the temperature.

Various types of cooler have been used for this purpose as for example glass tube coolers and impregnated graphite coolers. Because the circulating brine may contain dissolved chlorine the choice of metallic materials is very restricted.

In for example an article by W. G. Renshaw and Perry R. Bish entitled "Important Advantages of Titanium in the Chemical Industry," in "Corrosion," 1955, II, No. 1, pp. 57–63, it is stated that titanium should be an excellent material for all types of equipment handling chlorides where complicated fabrications may induce sufficient residual stress to cause cracking and that titanium should be useful for heat exchangers in the manufacture of nitric acid. Curves are given for instance to show the passivity of titanium for N/100 sodium chloride.

However, as it has been shown by a number of investigators in this field, certain metals of which vanadium, iron, titanium and chromium are examples, when present in pure brine, even to the extent of appreciably less than one part per million of the brine are liable to cause considerable increase in the amount of hydrogen discharge at the cathode of a mercury cell with a consequential tendency to contaminate the chlorine generated therein. This is very dangerous because explosive mixtures of hydrogen and chlorine may be produced. There is a particularly strong view held that titanium in this connection is harmful in trace amounts. This is attributed to the fact that titanium does not amalgamate with sodium amalgam and can therefore assist in setting up local electrolytic couples with amalgam as the anode and deposited titanium nuclei on the amalgam surface as the cathode.

It has now been found that a brine containing calcium ions and traces of titanium can be safely electrolysed in a mercury cell. Thus, for example, raw brines, which as they come from the wells are saturated with calcium sulphate and thus contain the equivalent of 1400 p.p.m. calcium, have after removal of at least substantially all their magnesium content, been found to be particularly suitable to be raised in temperature in titanium heat exchangers by waste brine leaving mercury cells and then to be fed into and electrolysed in mercury cells.

According to the present invention to process for the production of electrolytic products by the electrolysis of brine in a mercury cell wherein the brine is passed through a heat exchanger prior to entering the mercury cell is characterised in that the heat exchanger is made of titanium and in that the brine contains calcium ions.

Preferably the content of calcium ions in the brine is 600–1400 p.p.m. w./w.

If desired the brine of desired content of calcium ions entering a mercury cell is heated in the titanium heat exchanger by waste brine leaving a mercury cell.

On the other hand, if desired, the spent brine leaving a mercury cell is brought to the desired strength with sodium chloride, and if necessary to the required calcium content, and is cooled in the titanium heat exchanger by a cooling fluid passing therethrough prior to being introduced into and subjected to electrolysis in a mercury cell.

Titanium is advantageous as the material for the construction of heat exchangers for use in connection with the electrolysis of brine in mercury cells because, being a metal, it has a high thermal conductivity, and because it is one of the few metals which has a high degree of resistance to chlorinated brine. Other metals such as platinum or tantalum, which have the adequate corrosion resistance, are intrinsically too expensive in this connection whilst in addition the weight requirements would be relatively very large owing to the high density of platinum which is 21.4 and of tantalum which is 16.6. Titanium has a density of 4.6. Thus any thickness of material only contains one-quarter or one-fifth the weight of metal when made of titanium than when made of tantalum or platinum. If non-metallic materials are used, with either very much lower thermal conductivity or poor mechanical properties, the heat exchangers become unwieldy and expensive.

It has now been found that in heat exchangers of the kind to permit high flow rates for use in the carrying out of the present invention the heat exchange components can be constructed from press-moulded titanium sheets.

A heat exchanger, therefore, of the kind which permits high flow rates and in which the heat exchange components are constructed of metal sheet is characterised in that the heat exchange components are constructed of press-moulded titanium sheet.

In a heat exchanger of the invention the press-moulded titanium sheet can be relatively thin which reduces the titanium requirement; the high flow rate permits high brine velocity over the heat exchange surfaces with consequent high heat transfer coefficients, which again reduces the titanium requirement; the parts thereof can be easily cleaned; and the titanium sheet can be easily fabricated and manipulated.

An embodiment of a heat exchanger according to the invention is described by way of example with reference to the diagrammatic drawing accompanying the provisional specification which illustrates in perspective an exploded view of the embodiment and also illustrates the flow paths of brine between the heat exchanger plates of the embodiment.

In the drawing, 1 are corrugated press-moulded titanium plates positioned between the fixed head of a supporting frame and a movable pressure plate (not shown). The plates 1 are pressed tightly together with intervening thin rubber gaskets 2, 3 in the manner of a filter press, gaskets 2, 3 providing seals at the edges of plates 1 and forming compartments between plates 1. Each plate 1 has a port 4 at each of its four corners and a suitable arrangement of the gaskets 2, 3 as at 5, 6, 7, 8 allows feed brine to follow paths 9 whilst waste brine follows paths 10 without intermingling, the two flows being substantially countercurrent.

Parts of the heat exchanger, other than plates 1 and gaskets 2, 3, in contact with brine may be of titanium or of other suitable material, for example ebonite-lined mild steel.

By employing the process and a heat exchanger according to the invention is a battery of mercury cells in a waste brine process it has been shown in preliminary experiments that by raising the feed temperature from 9° C. to 35.7° C. the voltage saving per cell is 134 mv. at 2 ka./m.², which is equivalent to 112 wh./ton chlorine, or 3 percent of the total energy which would be required if the process and the heat exchanger of the invention were not used.

What we claim is:

1. In a process for the production of electrolytic products by electrolysis of brine in a mercury cell in which brine is passed through a heat exchanger before entering the mercury cell; the improvement in which the surface of said heat exchanger exposed to brine is made of titanium and said brine contains calcium ions.

2. A process as claimed in claim 1 in which the content of the calcium ions in the brine is 600–1400 p.p.m. by weight.

3. A process as claimed in claim 1 in which the brine entering the mercury cell is heated in the titanium heat exchanger by waste brine leaving a mercury cell.

4. A process as claimed in claim 3 including adding sodium chloride to said waste brine leaving a mercury cell before it passes through the heat exchanger, said waste brine being cooled in the heat exchanger.

5. A process as claimed in claim 4 including adjusting the calcium ion content of said waste brine and returning it to said mercury cell.

References Cited in the file of this patent

UNITED STATES PATENTS

| | | |
|---|---|---|
| 2,248,137 | Taylor et al. | July 8, 1941 |
| 2,787,591 | Gardiner et al. | Apr. 2, 1957 |
| 2,836,551 | Heller et al. | May 27, 1958 |
| 2,869,835 | Butt | Jan. 20, 1959 |
| 2,874,941 | Woolard et al. | Feb. 24, 1959 |
| 2,949,412 | Neipert et al. | Aug. 16, 1960 |

FOREIGN PATENTS

| | | |
|---|---|---|
| 217,414 | Great Britain | June 19, 1924 |
| 541,292 | Great Britain | Nov. 20, 1941 |
| 772,226 | Great Britain | Apr. 10, 1957 |

OTHER REFERENCES

Kenyon et al.: "Industrial and Engineering Chemistry," volume 45, No. 6, pages 1162–1172.